United States Patent [19]

Gietzen et al.

[11] Patent Number: 4,875,643

[45] Date of Patent: Oct. 24, 1989

[54] STARTER ARRANGEMENT FOR A HELICOPTER

[75] Inventors: Staas Gietzen, Leonberg; Hans Weiner, Mühlacker; Klaus Hain, Leonberg; August Hofbauer, Pforzheim; Juergen Hawener, Möglingen, all of Fed. Rep. of Germany

[73] Assignee: Dr. Ing. h.c.F. Porsche AG, Stuttgart, Fed. Rep. of Germany

[21] Appl. No.: 247,335

[22] Filed: Sep. 21, 1988

[30] Foreign Application Priority Data

Oct. 26, 1987 [DE] Fed. Rep. of Germany ....... 3736110

[51] Int. Cl.⁴ .............................................. B64D 31/02
[52] U.S. Cl. ........................... 244/53 A; 123/179 AS; 416/170 R; 244/17.11
[58] Field of Search ................ 244/53 A, 17.11, 53 R; 123/179 AS; 416/170 B, 169 R; 60/39.141, 39.142

[56] References Cited

U.S. PATENT DOCUMENTS

| 1,734,263 | 11/1929 | Many | 244/53 A |
|---|---|---|---|
| 3,325,122 | 6/1967 | Young | 244/17.13 |
| 3,455,182 | 7/1969 | Kelley | 74/661 |
| 3,938,320 | 2/1976 | Nelson | 60/39.281 |
| 4,046,335 | 9/1977 | Osberger | 244/17.19 |

FOREIGN PATENT DOCUMENTS

| 0092424 | 10/1983 | European Pat. Off. | |
|---|---|---|---|
| 657045 | 7/1935 | Fed. Rep. of Germany | |
| 1902875 | 10/1964 | Fed. Rep. of Germany | |
| 2165042 | 7/1972 | Fed. Rep. of Germany | |
| 2401678 | 7/1975 | Fed. Rep. of Germany | |
| 2516900 | 9/1979 | Fed. Rep. of Germany | |
| 3000315 | 8/1980 | Fed. Rep. of Germany | |
| 3517225 | 11/1985 | Fed. Rep. of Germany | |
| 1230707 | 9/1960 | France | 416/170 B |
| 422531 | 4/1967 | Switzerland | |
| 1219457 | 1/1971 | United Kingdom | |

Primary Examiner—Joseph F. Peters, Jr.
Assistant Examiner—Rodney Corl
Attorney, Agent, or Firm—Barnes & Thornburg

[57] ABSTRACT

A helicopter equipped with a reciprocating piston internal combustion engine in which an override clutch is arranged in a drive connection between the internal combustion engine and a rotor drive, is equipped with separate first and second electric motor starter devices (screw-push starters). A starter operation takes place in two phases whereby in a first phase initially the rotor drive is brought to a rotor synchronous rotational speed syn by means of the first starter device and in a second phase the internal combustion engine is started by means of the second starter device. When the internal combustion engine exceeds the idling rotational speed nl, the override clutch establishes the power-flow connection between the internal combustion engine and the rotor drive. Both phases can be carried out manually as also by a partly automatic or fully automatic control system on the basis of key depression.

18 Claims, 4 Drawing Sheets

STARTER ARRANGEMENT FOR A HELICOPTER

BACKGROUND AND SUMMARY OF THE INVENTION

The present invention relates to a starter arrangement for a helicopter driven by means of a reciprocating piston internal combustion engine in which at least one override clutch is arranged in a drive connection between the internal combustion engine and the rotor drive which separates the drive connection as soon as the output rotational speed of the override clutch, identical with the rotor driving rotational speed is higher than the input rotational speed thereof which is identical with the internal combustion engine rotational speed or with the transmission output rotational speed of a transmission connected ahead of the override clutch.

Small helicopters are frequently driven by reciprocating piston internal combustion engines: a tensionable belt serves as drive connection between the internal combustion engine and the rotor drive. For starting the helicopter, at first the internal combustion engine is started with an non-tensioned belt and with a running internal combustion engine the rotor drive is accelerated by a slow, increasing tensioning of the belt for such length of time until the belt operates without slippage.

A direct drive connection between the internal combustion engine and the rotor is not possible as a rule during the start of the helicopter because reciprocating piston internal combustion engines at rotational speeds below the idling rotational speed generally have an insufficient smooth running, i.e., exhibit excessive torque fluctuations and the inert but sensitive rotor drive can therefore possibly be excited to non-permisssively high rotational vibrations, respectively, can be damaged thereby.

The tensioning of the belt during the start, however, requires a not-inconsiderable force application and a certain fine feel during the operation as otherwise undesirable vibrations can easily build up. Furthermore, the belt drive is subjected to a strong wear.

It is therefore the object of the present invention to provide a starting arrangement for a helicopter equipped with a reciprocating piston internal combustion engine which shortens the operation of the start and is constructed in a simple and reliable manner.

The underlying problems are solved according to the present invention in that the rotor drive and the internal combustion engine are provided with separate first and second electric motor starter devices and in a first phase of a starting operation initially the rotor drive is accelerated by means of the first starter device to a synchronous rotational speed and upon reaching the synchronous rotational speed in a following second phase, the internal combustion engine is started by means of the second starter device whereby the internal combustion engine takes over the drive of the rotor or rotors as soon as its rotational speed exceeds a value at which the override clutch establishes the power flow between the internal combustion engine and the rotor drive.

The advantages of the present invention reside in the first instance in the accelerated, more simple and more reliable starting operation of a helicopter. The arrangement necessary therefor is characterized by the simplicity of the utilized components as well as by robustness and far-reaching freedom of wear.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
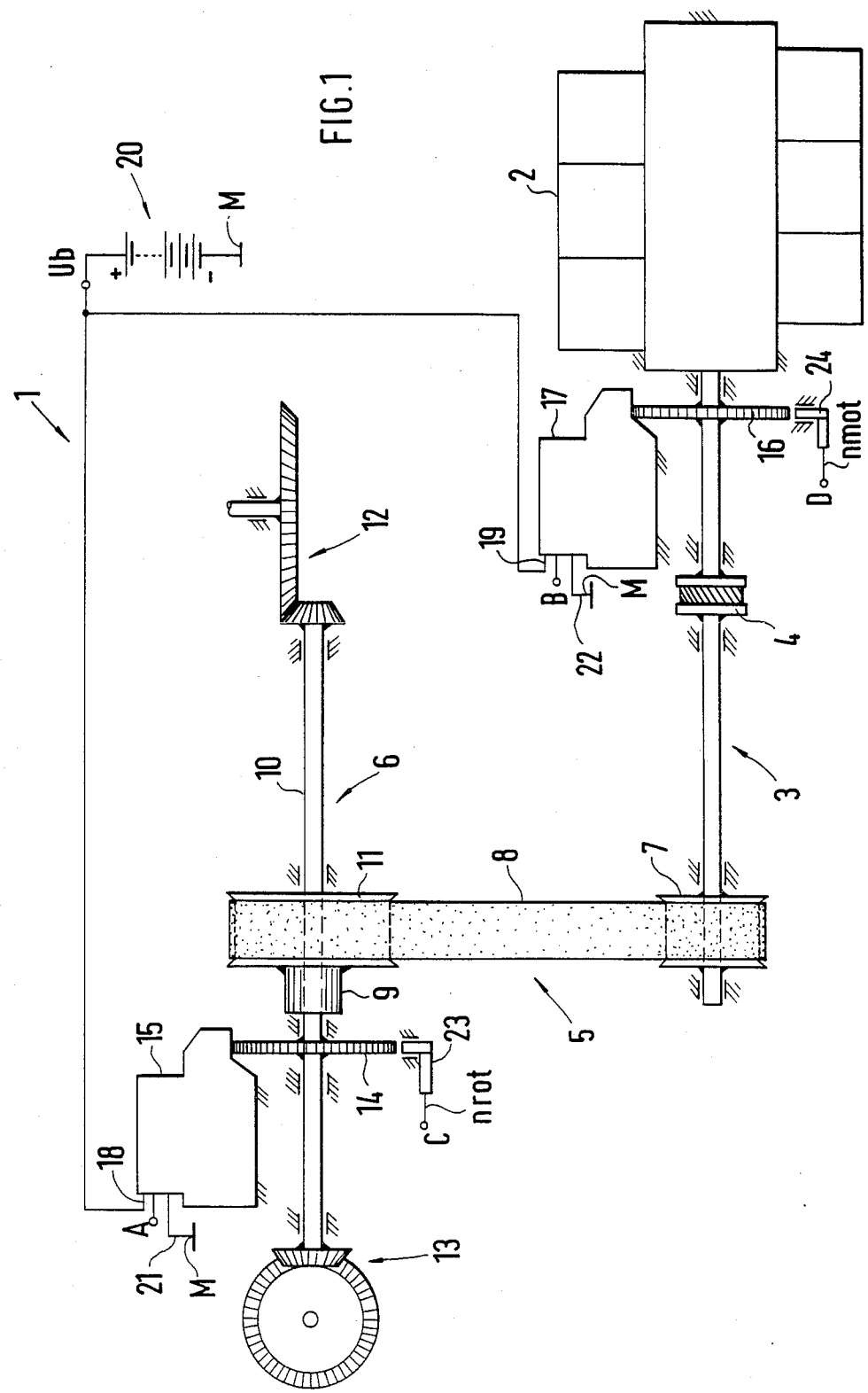
FIG. 1 is a schematic view of starter arrangement for a helicopter with a first and a second starter device in accordance with the present invention.

Referring now to the drawing wherein like reference numerals are used throughout the various views to designate like parts, a starter arrangement for a helicopter is generally designated in FIG. 1 by reference numeral 1, the helicopter is driven by a multi-cylinder reciprocating piston internal combustion engine 2. The internal combustion engine 2 drives a rotor drive 6 by way of a drive shaft 3 into which an elastic coupling 4 may be inserted and by way of a belt drive generally designated by reference numeral 5. Additionally, a spur gear rotational speed reduction transmission may be connected between the internal combustion engine 2 and the drive shaft 3 which, however, is not illustrated herein.

The belt drive 5 consists of a first belt pulley 7 nonrotatably connected with the drive shaft 3, of a belt 8 and of a second belt pulley 11 acting by way of an override clutch 9 on a rotor drive shaft 10. The override clutch 9 thereby separates the drive connection between the second belt pulley 11 and the rotor drive shaft 10 as soon as the latter rotates faster than the second belt pulley 11. It is assured thereby that the rotor drive can continue to rotate with a missing, respectively, stalled or blocked internal combustion engine 2 ("Autorotation") in order to keep the helicopter conditionally capable of flight at least for a certain period of time.

A main rotor (not shown) is driven by means of the rotor shaft 10 by way of a first angle gear transmission 12 and a rear or auxiliary rotor (not shown) is driven by means of the rotor drive shaft 10 by way of a second angle gear transmission 13. Furthermore, various bearing places (not designated) for the internal combustion engine 2, the two shafts 3 and 10 and the gear transmissions 12 and 13 are indicated in the drawing which must not necessarily be arranged at the indicated places.

A first gear 14 is nonrotatably connected with the rotor drive shaft 10, with which meshes a pinion (not shown) of a first starter device 15. Similarly, a second gear 16 (or a flywheel provided with a toothed rim) is nonrotatably arranged on the drive shaft 3, with which a pinion (not shown) of a second starter device 17 can mesh.

The first and second starter devices 15 and 17 finally include operating current inputs 18 and 19 which are connected to a first terminal (plus terminal +, power supply voltage Ub) of a starter battery 20 as well as a ground connection 21 and 22 each which is connected with (aircraft −) ground M and the second terminal (minus terminal −) of the starter battery 20. The starter devices 15 and 17 are adapted to be controlled by way of control inputs A and B so that their pinions mesh with the gears 14 and 16 and the latter can be started thereby.

The starter devices 15 and 17 are preferably constructed as conventional electric motor screw push starters as are known from the motor vehicle industry and are described, for example, in "Bosch Kraftfahrtechnisches Taschenbuch" ["Bosch Motor Vehicle Technical Pocketbook"], 19th Edition 84, on pages 438 to 440.

The starter arrangement further includes a first rotational speed-detecting device 23 coordinated to the rotor drive shaft 10 and a second rotational speed-detection device 24 coordinated to the drive shaft 3. These rotational speed-detection devices are constructed, for example, as tacho generators or Hall generators whereby the latter count the passing teeth of the first and second gear 14 and 16 and produce at their outputs C and D a signal proportional to the rotor drive shafts-rotational speed nrot, respectively, the drive shafts-or internal combustion engine-rotational speed nmot. In the alternative thereto, also the input and output rotational speeds at the override clutch 9 can be detected by means of these devices 23 and 24, for which purpose, of course, a toothed rim must be arranged at the second belt pulley 11 which rotates with same.

A starting operation of the helicopter now proceeds as follows:

In a first phase initially the first starter device 15 is activated so that the pinion thereof meshes with the first gear 14 and accelerates the rotor drive 6. This is possible without influencing the internal combustion engine 2 because the override clutch 9 enables a free rotation of the rotor drive shaft 10 with a nonrotating or standing-still engine drive shaft 3. If the rotor drive shaft 10 has reached a rotational speed which corresponds to a rotational speed (synchronous rotational speed syn) of the second belt pulley 11 during idling of the internal combustion engine (idling rotational speed n1), then the activation of the first starter device 15 is stopped and in a second second phase the internal combustion engine 2 is started by means of the second starter device 17. After a successful starting of the internal combustion engine 2 the latter accelerates up to the idling rotational speed n1 so that the override clutch 9 establishes the power flow connection between the second belt pulley 11 and the rotor drive shaft 10 and therewith the internal combustion engine 2 takes over the drive of the rotors.

The activation of the starting operation can now be realized in various ways as will be described by reference to the following figures.

Figure 2:
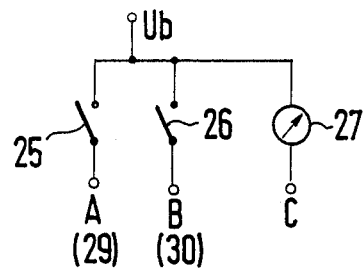
FIG. 2 is an electric circuit diagram of a start arrangement in accordance with the present invention.

FIG. 2 illustrates a simple starter arrangement with two key switches 25 and 26 whereby the first key switch 25 connects the control input A of the first starter device 15 and the second key switch 26 connects the control input B of the second starter device 17 with the power supply voltage Ub. A rotational speed indicator 27 serves for the purpose of controlling the rotor drive rotational speed nrot and for that purpose is connected with the output C of the first rotational speed-detection device 23.

The starting operation is now carried out by a pilot of the helicopter in that he initially actuates the first key switch 25 and monitors the rotor driving rotational speed nrot on the rotational speed indicator 27. If the rotor drive shaft 6 has reached the synchronous rotational speed syn (nrot=syn) then the pilot releases the first key switch 25 and actuates the second key 26 for starting the internal combustion engine 2 until the latter has started to run. If the internal combustion engine does not start at all or does not start up immediately, then he can actuate anew the second key switch 26 as long as the rotor driving rotational speed nrot has not yet dropped below the synchronous rotational speed syn (or not significantly dropped below the same). If the latter is the case, then he has to carry out anew the entire starting operation.

However, this simple starting arrangement demands of the pilot the strict compliance with the sequence of the starting operation and the avoidance of incorrect actuations which, under some circumstances, could lead to the damaging of parts of the helicopter.

Figure 3:
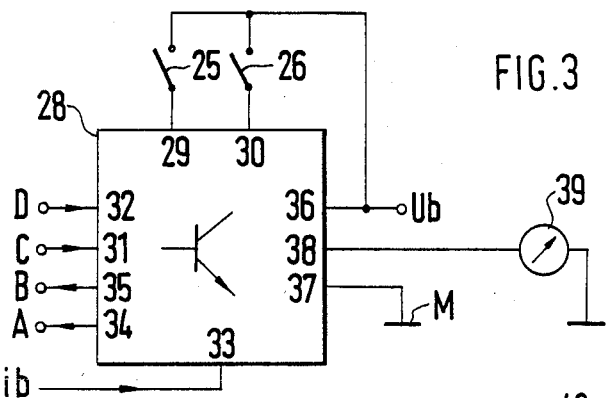
FIG. 3 is an electric circuit diagram, similar to FIG. 2, but equipped with a control apparatus in accordance with the present invention.

FIG. 3 therefore illustrates a control apparatus 28 which (in a simple version) subjects the actuation of the first and second key switch to a blocking action (FIG. 4) or (in a more complex version) undertakes the entire starting operation in its two phases by key depression of solely one key switch 25.

The control apparatus 28 according to FIG. 3 includes for that purpose inputs 29 and 30 for at least one of the two key switches 25 and 26 as well as inputs 31 and 32 for the rotor drive shaft rotational speed nrot and the (engine) drive shaft rotational speed nmot. Additionally, a further input 33 for a current-measuring signal ib of a current-measuring device (not shown) for a current input of the second starter device 17 may be provided. Depending on signals at these inputs 29 to 33, the control apparatus 28 controls outputs 34 (control input A of the first starter device 15) and 35 (control input B of the second starter device 17).

The control apparatus 28 is supplied by way of inputs 36 and 37 with the power supply voltage Ub and with ground M. An output 38 finally serves for the activation of an indicator 39 for the rotational speed nrot, respectively, nmot.

Figure 4:
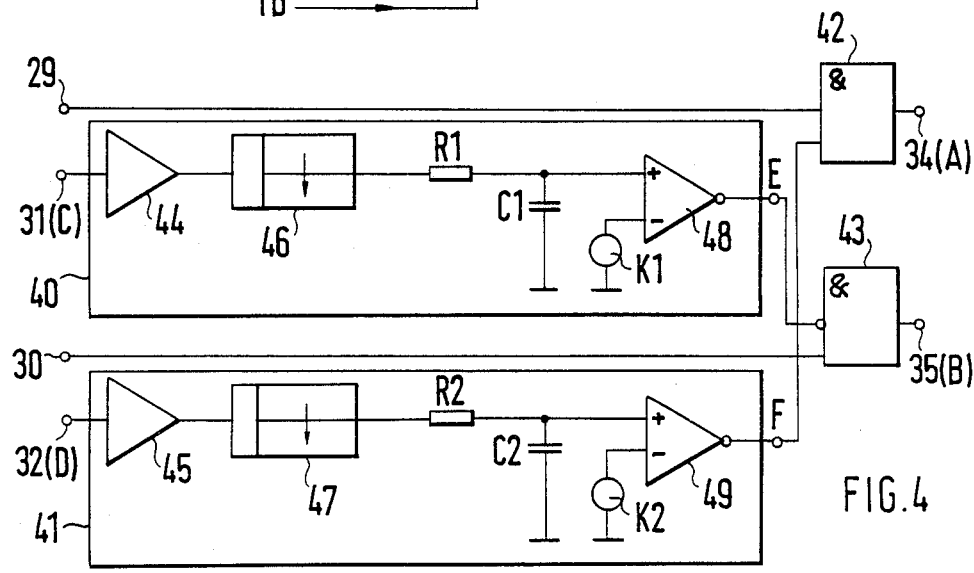
FIG. 4 is a circuit diagram of the control apparatus according to FIG. 3.

An internal circuit connection of the control apparatus 28 according to the simpler version is shown in FIG. 4. It includes two threshold stages 40 and 41 for the rotational speeds nrot and nmot as well as two blocking devices (AND elements) 42 and 43.

The threshold stages 40 and 41 may be constructed, though not necessarily so, in the manner illustrated in the drawing: an input amplifier 44 (45) prepares the pulse-shaped rotational speed signal nrot (nmot) and conducts it to a D-flip-flop 46 (47) whose output is connected with an R-C-element R1, C1 (R2, C2). An inverting Schmitt-trigger 48 (49) compares a voltage existing at the condenser C1 (C2) with a constant value K1 (K2). The signal existing at the output E (F) of the Schmitt-trigger 48 (49) and therewith of the threshold stage 40 (41) changes its signal level from "HIGH" to "LOW" as soon as the rotor rotational speed nrot exceeds the synchronous rotational speed syn (respectively, the engine rotational speed nmot exceeds the idling rotational speed n1).

The blocking circuit 42 thus produces an activating signal for the first starter device 15 only insofar as the first key switch 25 is depressed and at the same time the rotational speed nmot has not yet reached the idling rotational speed n1. Similarly, the blocking circuit 43 produces an activating signal for the second starter device 16 only insofar as the second key switch 26 is depressed and at the same time the rotational speed nrot has not yet exceeded the synchronous rotational speed.

Figure 5:
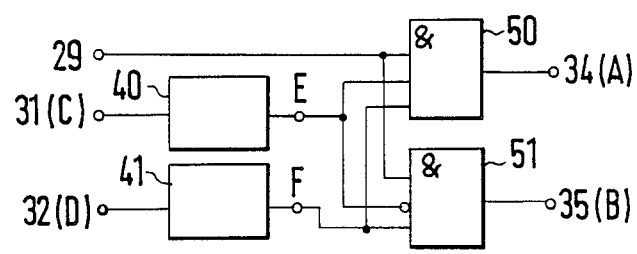
FIG. 5 is a circuit diagram, similar to FIG. 4, of a modified embodiment of a control apparatus in accordance with the present invention.

The more complex version according to FIG. 5 is constructed in a similar manner. It contains the same threshold stages 40 and 41 but is activated by only a single key switch 25 which must remain depressed during the entire starting operation. The first and the second starter device 15 and 17 are activated by way of the blocking circuits (AND elements) 50 and 51, whereby the first starter device 15 is only activated as long as the rotor driving rotational speed nrot has not yet reached the synchronous rotational speed syn and the engine rotational speed nmot has not reached the idling rotational speed n1 and the second starter device 17 is activated only as long as the rotor driving rotational speed nrot has not yet exceeded the synchronous rotational speed syn and the engine rotational speed nmot has not yet exceeded the idling rotational speed n1. Power driver components (for example, relays or electronic end stages) may be connected ahead of the outputs 34 and 35 which raise the output level of the circuits 42, 43, 50 and 51 to the level necessary for the activation of the starter devices 15 and 17 (not shown).

Of course, the control apparatus can also be constructed on the basis of a microcomputer which includes, in a known manner, a microprocessor and all peripheral components necessary for its operation.

Figure 6:
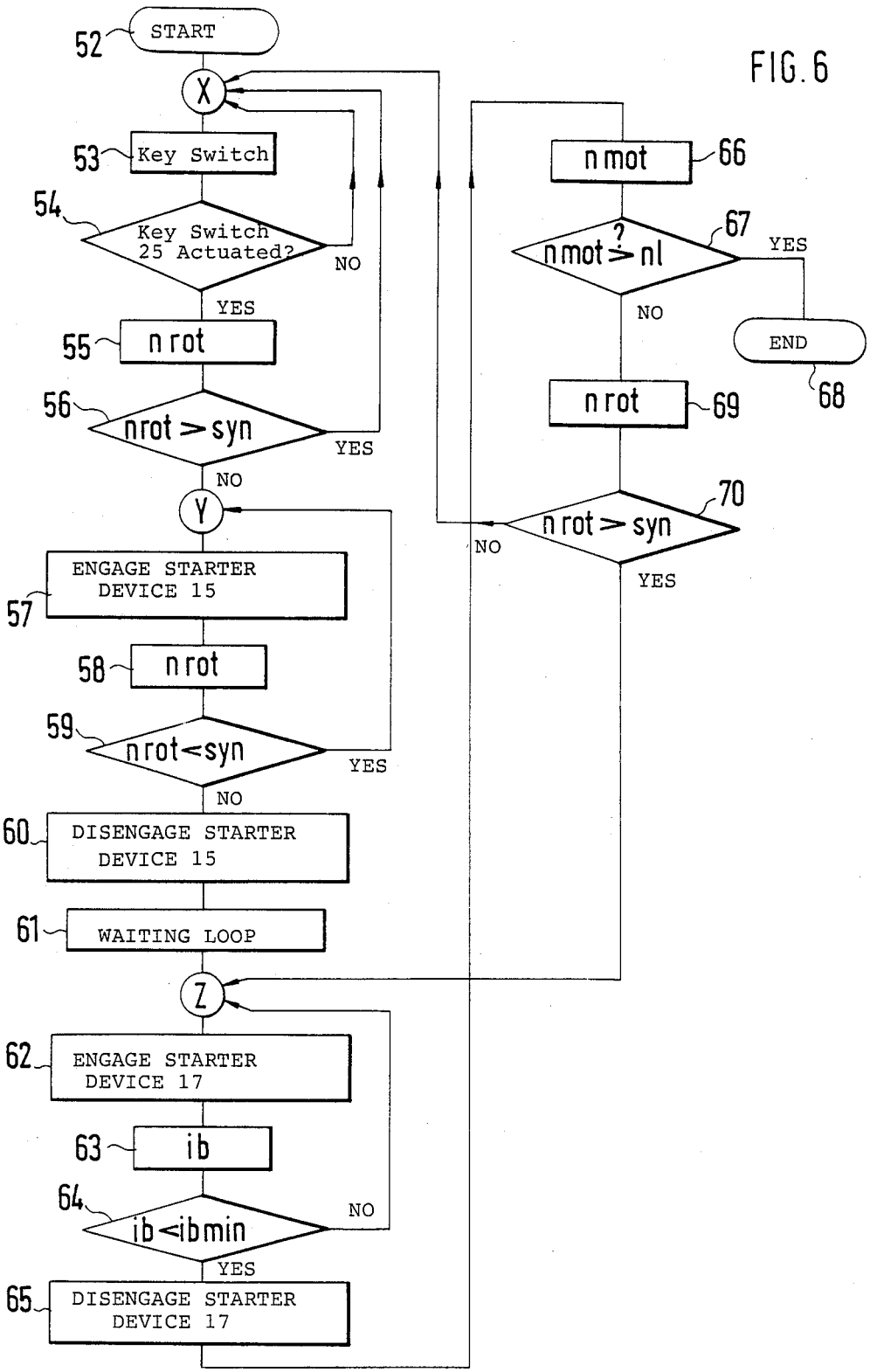
FIG. 6 is a flow diagram for a control apparatus which is equipped with a microcomputer.

The microcomputer system thereby includes a program which proceeds corresponding to the flow diagram in FIG. 6. After the start of the program, 52, and after passing a label X, the program proceeds to a determination of the position of the key switch 25, 53. Query is made, 54, whether the key switch 25 is closed, if no, the program branches back to the label X, if yes, the rotor rotational speed nrot is detected, 55. It is then clarified in a query 56 whether the rotor rotational speed nrot is greater than the synchronous rotational speed syn; if yes, the program branches back to the label X, if no, after passing a label Y, the output 34 is activated, 57. The rotor rotational speed nrot is detected anew, 58, and it is queried, 59, whether the rotor rotational speed nrot is smaller than the synchronous rotational speed syn; if yes, the program returns to the label Y, if no, the activation of the output 34 is retracted or cancelled, 60, and after passing a waiting loop 61 and a label Z, the starter device 17 is activated, 62. After detecting the current input ib, 63, the program queries whether this current input lies below a threshold value $i_{min}$, 64 (in the alternative thereto, also the change of the current input dib/dt can be detected and can be compared with a minimum value dib/dt$|_{min}$); if no (the engine does not yet run), the program branches back to the label Z, if yes, the activation of the output 35 is cancelled, 65.

The engine rotational speed nmot is detected, 66 and the program queries whether the engine rotational speed is greater than the idling rotational speed n1, 67; if yes (the internal combustion engine is running), the program is terminated; if no, the rotor rotational speed nrot is anew detected, 69 and the program queries 70, whether the rotor rotational speed nrot is smaller than the synchronous rotational speed syn. If no, the program jumps to the label Z, if yes, to the label X so that the entire operation can be repeated.

The flow diagram according to FIG. 6 provides an automatic start of the helicopter based on an instantaneous button pressure of the key switch 25. For safety reasons, however, it may also be useful that the starting operation can be interrupted at any time. This requires, on the one hand, a continuous depressing of the key switch 25 by the pilot during the entire starting operation whereas, on the other, in the program to be realized the position of the key switch 25 has to be constantly queried or interrogated.

Figure 7:
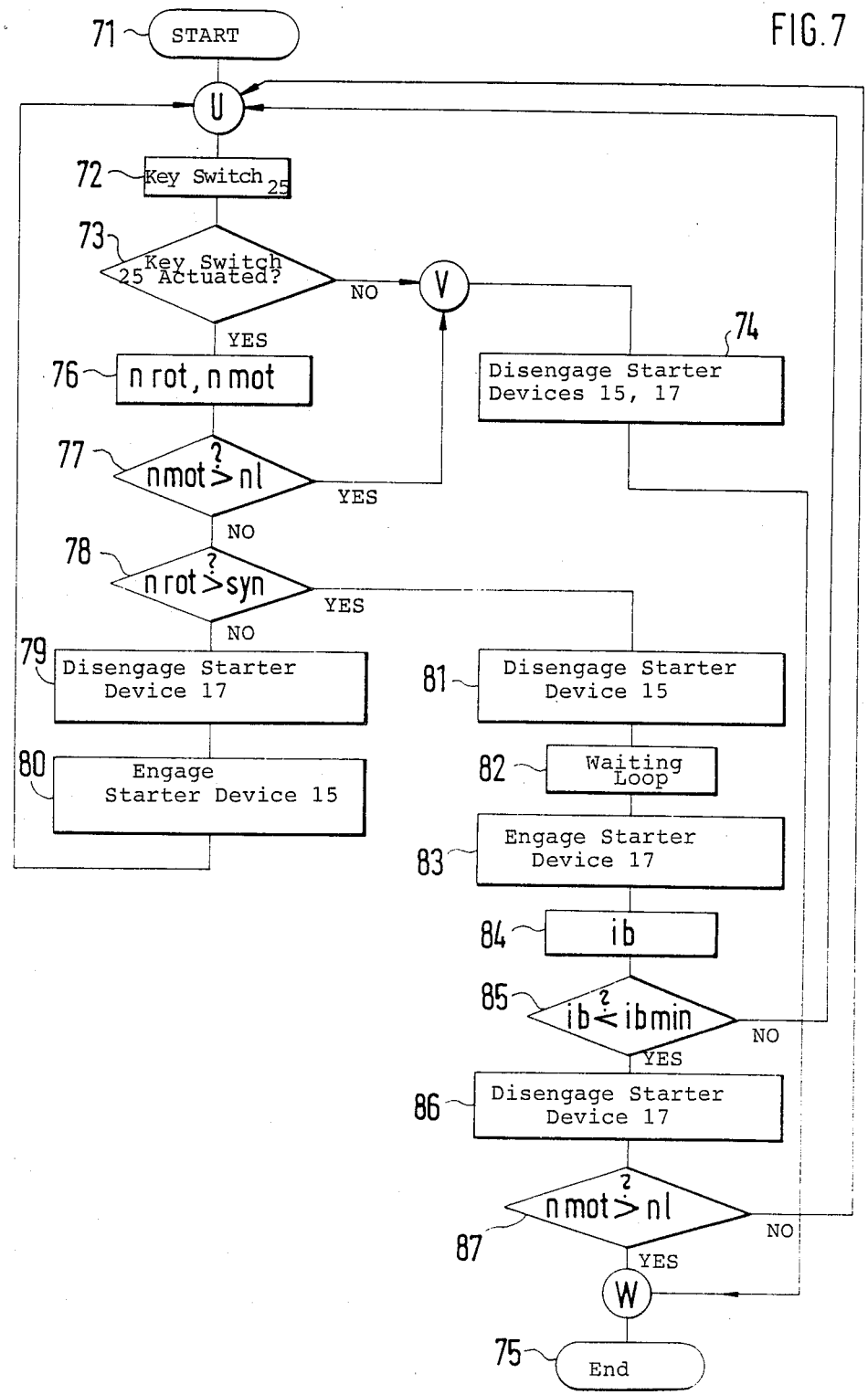
FIG. 7 is a flow diagram according to FIG. 6, but equipped with a continuous monitoring of a key switch in accordance with the present invention.

A flow diagram for this modification is shown in FIG. 7:

A program start 71 is initiated by the actuation of the key switch 25 (for example, by way of an interrupt input of the microcomputer) and includes the usual initialization measures. After passing the label U, the position of the key switch 25 is detected, 72 and the program queries whether the key switch 25 is actuated, 73; if no, the program is continued by way of a label V and by way of a program step 74 effecting a de-energization or disengagement of the starter device 15 and by way of a label 17 and by way of a label W to the program end 75, if yes, the program will query the drive shaft rotational speed nmot and the rotor drive shaft rotational speed nrot, 76.

It is examined in a query 77 whether nmot is greater than the idling rotational speed n1, if yes, the program branches to the label V, if no, it is clarified in a further query 78 whether nrot is greater than the synchronous rotational speed syn. If no, the starter device 17 is disengaged or de-energized, 79 and the starter device 15 is engaged, 80 and the program returns to the label U, if yes, the starter device 15 is de-energized or disengaged, and after passing a waiting loop 82, the starter device 17 is activated, 83.

The current input of the second starter device 17 is detected, 84 and it is queried, 85, whether the current input ib is smaller than the minimum current input ibmin. If no, the program returns back to the label U, if yes, the starter device 17 is turned off, 86 and the program queries anew, 87, whether the drive shaft rotational speed nmot is greater than the idling rotational speed n1; if no, the program jumps back to the label U, if yes, the program carries out a jump by way of the label W to the program end 75.

Of course (without limitation of the generality) in lieu of the electromotorized starter devices, also, for example, known compressed air starter devices may be used. The two outputs 34 and 35 of the control apparatus 28 then control electromagnetic valves, by way of which the starter devices can be connected with a compressed air reservoir.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A starter arrangement for a helicopter driven by means of a reciprocating piston internal combustion engine, comprising at least one override clutch means arranged in a drive connection means between the internal combustion engine and a rotor drive means, said override clutch means being operable to disconnect the drive connection means as soon as the output rotational speed of the override clutch means which is identical with the rotor drive rotational speed is higher than the input rotational speed which is proportional to the internal combustion engine rotational speed, separate first and second starter means for the rotor drive means and the internal combustion engine, and further means operable in a first phase of a starting operation to initially accelerate the rotor drive means by means of the first starter means to a synchronous rotational speed and upon reaching the synchronous rotational speed in a subsequent second phase, for starting the internal combustion engine by means of the second starter means, and the internal combustion engine taking over the drive of the rotor as soon as its rotational speed exceeds a value at which the override clutch means establishes the power connection between the internal combustion engine and the rotor drive means.

2. A starter arrangement according to claim 1, wherein the input rotational speed of the override clutch means is identical with the rotational speed of the internal combustion engine.

3. A starter arrangement according to claim 1, wherein the input rotational speed of the override clutch means is identical with the output rotational speed of a transmission interconnected between the internal combustion engine and the override clutch means.

4. A starter arrangement according to claim 1, wherein the rotational speeds of the internal combustion engine, respectively of its drive shaft and the rotor drive means, respectively, the input and the output rotational speed of the override clutch means and/or the difference rotational speed in the override clutch means is monitored by at least one of a first and second rotational speed detection means and/or a rotational speed indicating means, and wherein the two phases of the starting operation are initiated and carried out by a pilot by way of separate first and second electric key switch means.

5. A starter arrangement according to claim 4, wherein the rotational speeds of the internal combustion engine and of the rotor drive means, respectively, the input and output rotational speeds of the override clutch means and/or the rotational speed difference in the override clutch means are monitored by means of at least one rotational speed detection means, and wherein at least one key switch means for initiating the second phase of the starting operation includes a blocking means which suppresses the activation of the second starter means as long as the rotor drive means has not yet reached the synchronous rotational speed.

6. A starter arrangement according to claim 1, wherein, after actuation of a single key switch means, the starting operation is initiated and carried out by a sequence control means.

7. A starter arrangement according to claim 6, wherein the sequence control means monitors the rotational speeds of the internal combustion engine and of the rotor drive means, respectively, the input and the output rotational speeds of the override clutch means and/or the difference rotational speed in the override clutch means and the key switch means and controls the starting operation in dependence thereon.

8. A starter arrangement according to claim 7, wherein the sequence control means is constructed on the basis of a microcomputer system.

9. A starter arrangement according to claim 8, wherein the sequence control means monitors the position of the key switch means and with depressed key switch means examines whether the rotor rotational speed is greater than the synchronous speed, whereby with a lower rotor rotational speed the first starter means is activated for such length of time until the synchronous rotational speed is reached, and whereby the sequence control means after a predetermined time interval activates the second starter means for starting the internal combustion engine.

10. A starter arrangement according to claim 9, wherein the sequence control means monitors by means of a current-measuring means the current input of the second starter means during the starting of the internal combustion engine and when dropping below a minimum current input and/or a minimum current input change, interrupts the operation of the starting.

11. A starter arrangement according to claim 10, wherein the sequence control means monitors the rotational speed of the rotor drive means during the starting operation of the internal combustion engine and with an unsuccessful start of the internal combustion engine, repeats the operation of the starting of the internal combustion engine with a sufficient rotor rotational speed or repeats the entire starting operation with too low a rotor rotational speed.

12. A starter arrangement according to claim 11, wherein the sequence control means constantly monitors the position of the key switch means and the starting operation can be interrupted at any time by the release of the key switch means.

13. A starter arrangement according to claim 8, wherein the sequence control means constantly monitors the position of the key switch means and the starting operation can be interrupted at any time by the release of the key switch means.

14. A starter arrangement according to claim 13, wherein the sequence control means monitors the position of the key switch means and with depressed key switch means examines whether the rotor rotational speed is greater than the synchronous speed, whereby with a lower rotor rotational speed the first starter means is activated for such length of time until the synchronous rotational speed is reached, and whereby the sequence control means after a predetermined time interval activates the second starter means for starting the internal combustion engine.

15. A starter arrangement according to claim 13, wherein the sequence control means monitors by means of a current-measuring means the current input of the second starter means during the starting of the internal combustion engine and when dropping below a minimum current input and/or a minimum current input change, interrupts the operation of the starting.

16. A starter arrangement according to claim 13, wherein the sequence control means monitors the rotational speed of the rotor drive means during the starting operation of the internal combustion engine and with an unsuccessful start of the internal combustion engine, repeats the operation of the starting of the internal combustion engine with a sufficient rotor rotational speed or repeats the entire starting operation with too low a rotor rotational speed.

17. A starter arrangement according to claim 8, wherein the sequence control means monitors by means of a current-measuring means the current input of the second starter means during the starting of the internal combustion engine and when dropping below a minimum current input and/or a minimum current input change, interrupts the operation of the starting.

18. A starter arrangement according to claim 8, wherein the sequence control means monitors the rotational speed of the rotor drive means during the starting operation of the internal combustion engine and with an unsuccessful start of the internal combustion engine, repeats the operation of the starting of the internal combustion engine with a sufficient rotor rotational speed or repeats the entire starting operation with too low a rotor rotational speed.

* * * * *